United States Patent
Kim et al.

(10) Patent No.: US 11,955,288 B2
(45) Date of Patent: Apr. 9, 2024

(54) MULTILAYER ELECTRONIC COMPONENT

(71) Applicant: SAMSUNG ELECTRO-MECHANICS CO., LTD., Suwon-si (KR)

(72) Inventors: Je Jung Kim, Suwon-si (KR); Do Yeon Kim, Suwon-si (KR); Jae Joon Lee, Suwon-si (KR); Seung Ryeol Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 11 days.

(21) Appl. No.: 17/686,051

(22) Filed: Mar. 3, 2022

(65) Prior Publication Data
US 2023/0170149 A1    Jun. 1, 2023

(30) Foreign Application Priority Data
Nov. 26, 2021    (KR) .................. 10-2021-0166008

(51) Int. Cl.
*H01G 4/30* (2006.01)
*H01G 4/012* (2006.01)
*H01G 4/12* (2006.01)

(52) U.S. Cl.
CPC ............. *H01G 4/30* (2013.01); *H01G 4/12* (2013.01)

(58) Field of Classification Search
CPC ............ H01G 4/30; H01G 4/12; H01G 4/012
(Continued)

(56) References Cited

U.S. PATENT DOCUMENTS 10,553,356 B1 * 2/2020 Kwon ............... H01G 4/30
10,629,377 B2 * 4/2020 Kwon ............... H01G 4/224
(Continued)

FOREIGN PATENT DOCUMENTS

JP    2006-13290 A    1/2006
JP    2007-137693 A    12/2008
(Continued)

OTHER PUBLICATIONS

Office Action issued in corresponding Japanese application 2022-033965 dated Mar. 10, 2023 with English Translation.
(Continued)

*Primary Examiner* — Arun Ramaswamy
(74) *Attorney, Agent, or Firm* — Morgan, Lewis & Bockius LLP

(57) ABSTRACT

A multilayer electronic component includes a body including a dielectric layer and first and second internal electrodes disposed to oppose each other with the dielectric layer interposed therebetween and including a capacitance forming portion, by which capacitance of the multilayer electronic component is defined, having the first and second internal electrodes disposed to oppose each other with the dielectric layer interposed therebetween, cover portions disposed on two opposing surfaces of the capacitance forming portion in a first direction, and margin portions disposed on two opposing surfaces of the capacitance forming portion in a second or third direction, in which $-3.0 < \{1-(Hc/H1)\} \times 100 \leq 0.4$, where an average hardness of the cover portions is Hc and an average hardness of the first margin portions is H1.

12 Claims, 5 Drawing Sheets

(58) Field of Classification Search
USPC .......................... 361/301.4, 311, 312, 321.1
See application file for complete search history.

(56) References Cited

U.S. PATENT DOCUMENTS

| | | |
|---|---|---|
| 2005/0286207 A1 | 12/2005 | Ito et al. |
| 2007/0218592 A1 | 9/2007 | Kobayashi et al. |
| 2012/0188684 A1* | 7/2012 | Akazawa ............... H01G 4/012 |
| | | 361/321.2 |
| 2018/0061575 A1* | 3/2018 | Mizuno ................. H01G 4/224 |
| 2020/0075254 A1 | 3/2020 | Park et al. |
| 2020/0082981 A1* | 3/2020 | Kwon ...................... H01G 4/30 |
| 2021/0151255 A1 | 5/2021 | Tahara et al. |
| 2021/0193389 A1* | 6/2021 | Kim ........................ H01G 4/12 |

FOREIGN PATENT DOCUMENTS

| | | |
|---|---|---|
| JP | 4506755 B2 | 7/2010 |
| JP | 2011-84433 A | 4/2011 |
| JP | 2014-210685 A | 11/2014 |
| JP | 2020-35992 A | 3/2020 |
| JP | 2021-061289 A | 4/2021 |
| JP | 2021-82685 A | 5/2021 |
| KR | 10-2020-0085701 A | 7/2020 |

OTHER PUBLICATIONS

Office Action issued in corresponding Japanese application 2022-033965 dated Mar. 22, 2023 with English Translation.
Japanese Pretrial Reexamination Report dated Dec. 14, 2023 issued in Japanese Patent Application No. 2022-033965 (with English translation).

* cited by examiner

MULTILAYER ELECTRONIC COMPONENT

CROSS-REFERENCE TO RELATED APPLICATION

This application claims the benefit of priority to Korean Patent Application No. 10-2021-0166008 filed on Nov. 26, 2021 in the Korean Intellectual Property Office, the disclosure of which is incorporated herein by reference in its entirety.

BACKGROUND

1. Technical Field

The present disclosure relates to a multilayer electronic component.

2. Description of Related Art

A multilayer ceramic capacitor (MLCC), a multilayer electronic component, is a chip-type condenser mounted on the printed circuit boards of various types of electronic products such as display devices including liquid crystal displays (LCDs) and plasma display panels (PDPs), computers, smartphones, cell phones, and the like to allow electricity to be charged therein and discharged therefrom.

Such an MLCC having advantages such as compactness, guaranteed high capacitance, and ease in mounting thereof may be used as a component of various electronic devices.

Recently, as electronic products have been miniaturized and have become multifunctional, demand for high integration and high capacitance of multilayer ceramic capacitors has increased, so that space between multilayer ceramic capacitors is minimized.

In addition, as multilayer ceramic capacitors are used in automobiles or infotainment systems, demand for high reliability, high strength characteristics, and miniaturization has increased.

In order to achieve such high integration, miniaturization, and high capacitance, it is necessary to increase the number of stacks by reducing a thickness of dielectric layers and internal electrodes. Currently, the thickness of the dielectric layer has reached a level of about 0.4 μm, and thinning continues.

However, when the dielectric layer is formed to have a thickness less than 0.4 μm, it may be difficult to secure withstand voltage characteristics and temperature stability at high temperatures is not secured due to the thinning of the dielectric layer.

Multilayer ceramic capacitors of the related art may have problems in that dielectric sheets and internal electrodes are elongated by stacking and compressing processes during a manufacturing process, resulting in poor withstand voltage characteristics and poor high-temperature reliability.

This problem may be aggravated while thinning the internal electrodes and the dielectric layers to achieve high integration, miniaturization, and high capacitance.

SUMMARY

An aspect of the present disclosure may solve a problem in which dielectric sheets and internal electrodes are elongated in the process of stacking and compressing multilayer electronic components, which adversely affects withstand voltage characteristics and high temperature reliability.

An aspect of the present disclosure may also solve a problem in which withstand voltage characteristics and high temperature reliability are aggravated when internal ceramic electrodes and dielectric layers are thinned to achieve high integration, miniaturization, and high capacitance.

However, the object of the present disclosure is not limited to the above, and will be more easily understood in the course of describing specific exemplary embodiments in the present disclosure.

According to an aspect of the present disclosure, a multilayer electronic component includes: a body including a dielectric layer and first and second internal electrodes disposed to oppose each other with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and first and second external electrodes disposed outside of the body and connected to the first and second internal electrodes, respectively, in the first direction. The body further includes: a capacitance forming portion, by which capacitance of the multilayer electronic component is defined, having the first and second internal electrodes disposed to oppose each other with the dielectric layer interposed therebetween, cover portions disposed on upper and lower surfaces of the capacitance forming portion in the first direction, and first margin portions disposed on two opposing surfaces of the capacitance forming portion in the second direction, wherein $-3.0 < \{1-(Hc/H1)\} \times 100 \leq 0.4$ where average hardness of the cover portions is Hc and average hardness of the first margin portions is H1.

According to another aspect of the present disclosure, a multilayer electronic component includes: a body including a dielectric layer and first and second internal electrodes disposed to oppose each other with the dielectric layer interposed therebetween interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and first and second external electrodes disposed outside of the body and connected to the first and second internal electrodes, respectively, in the first direction. The body further includes: a capacitance forming portion, by which capacitance of the multilayer electronic component is defined, having the first and second internal electrodes disposed to oppose each other with the dielectric layer interposed therebetween, cover portions disposed on two opposing surfaces of the capacitance forming portion in the first direction, and second margin portions disposed on one surface and the other surface of the capacitance forming portion in the third direction, wherein $-3.0 \leq \{1-(Hc/H2)\} \times 100 \leq 0.4$ where average hardness of the cover portions is Hc and average hardness of the second margin portions is H2.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
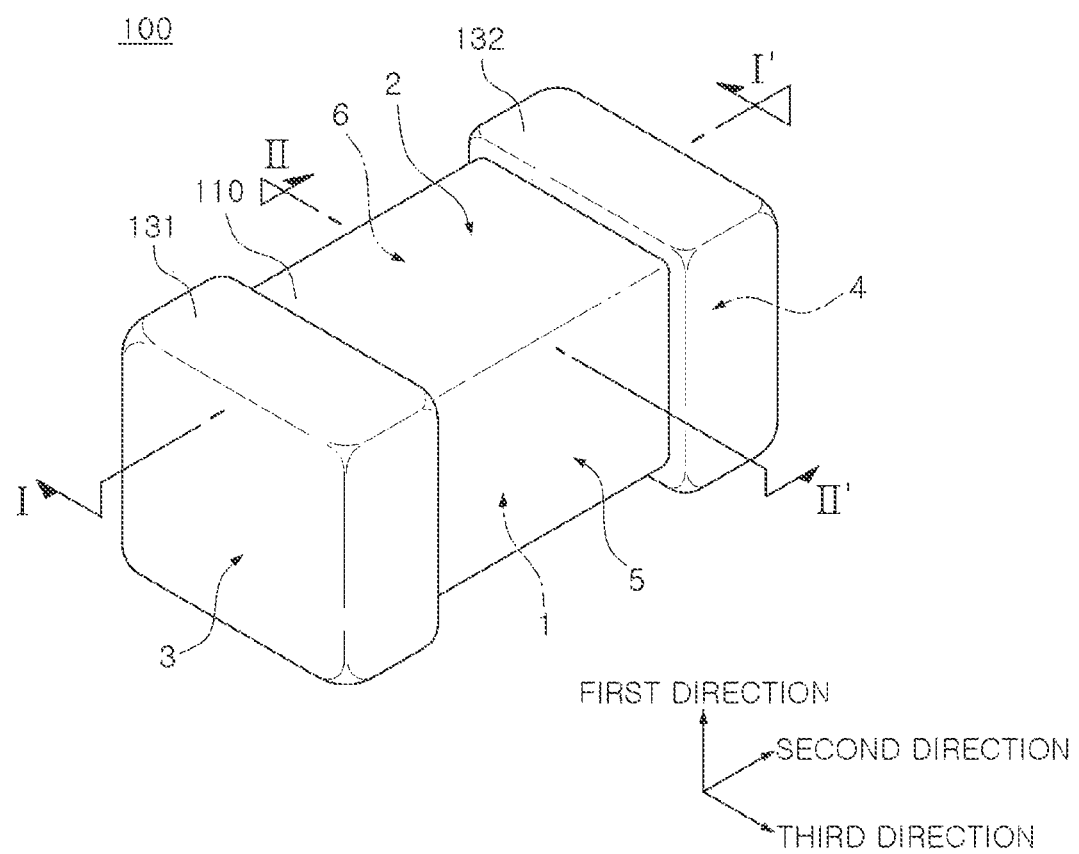
FIG. 1 is a perspective view schematically illustrating a multilayer electronic component according to an exemplary embodiment and another exemplary embodiment in the present disclosure.

Exemplary embodiments of the present disclosure will now be described in detail with reference to the accompanying drawings.

In the drawings, a first direction may be defined as a stacking direction or a thickness (T) direction, a second direction may be defined as a length (L) direction, and a third direction may be defined as a width (W) direction.

Multilayer Electronic Component

Hereinafter, a multilayer electronic component according to an exemplary embodiment in the present disclosure will be described in detail with reference to FIGS. 1 to 6.

A multilayer electronic component 100 according to an exemplary embodiment in the present disclosure may include a body 110 including a dielectric layer and first and second internal electrodes disposed to oppose each other with the dielectric layer interposed therebetween and including first and second surfaces opposing each other in the first direction, third and fourth surfaces connected to the first and second surfaces and opposing each other in the second direction, and fifth and sixth surfaces connected to the first to fourth surfaces and opposing each other in the third direction.

Referring to FIG. 1, in the body 110, a dielectric layer 111 and first and second internal electrodes 121 and 122 are alternately stacked.

A specific shape of the body 110 is not limited, but, as illustrated, the body 110 may have a hexahedral shape or a similar shape. Due to shrinkage of ceramic powder particle contained in the body 110 during sintering, the body 110 may not have a hexahedral shape with perfect straight lines but a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

A material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particle, and the ceramic powder particle may include $BaTiO_3$ and $(Ba_{1-x}Ca_x) TiO_3$, $Ba (Ti_{1-y}Ca_y)O_3$, $(Ba_{1-x}Ca_x)(Ti_{1-y}Zr_y)O_3$, or $Ba (Ti_{1-y}Zr_y)O_3$ obtained by partially dissolving calcium (Ca), zirconium (Zr), and the like in $BaTiO_3$.

As a material for forming the dielectric layer 111, various ceramic additives, organic solvents, binders, dispersants, etc. may be added to the powder particle such as barium titanate ($BaTiO_3$) or the like according to purposes of the present disclosure.

Figure 2:
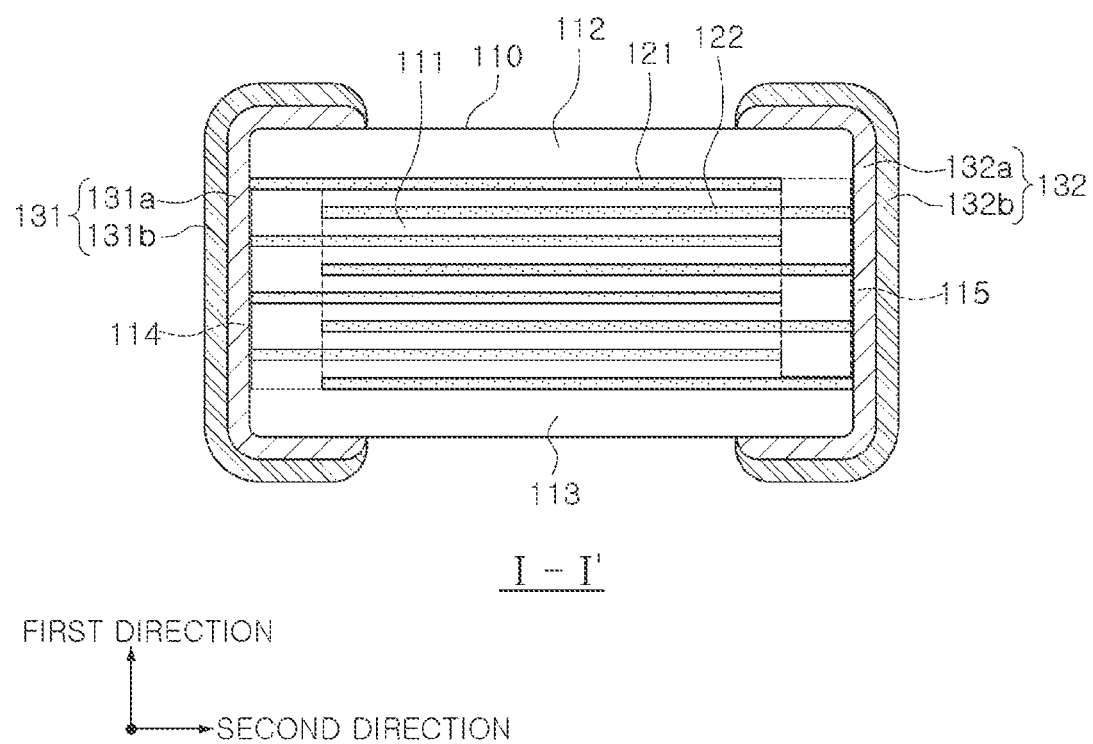
FIG. 2 schematically illustrates a cross-sectional view taken along line I-I' of FIG. 1.

Referring to FIG. 2, the body 110 may include a capacitance forming portion A disposed inside the body 110 and forming capacitance by including the first internal electrode 121 and the second internal electrode 122 disposed to oppose each other with the dielectric layer 111 interposed therebetween and cover portions 112 and 113 disposed on upper and lower surfaces of the capacitance forming portion A.

In addition, the capacitance forming portion A is a portion contributing to capacitance formation of the multilayer electronic component 100 and may be formed by repeatedly stacking a plurality of first and second internal electrodes 121 and 122 with the dielectric layer 111 interposed therebetween.

The upper cover portion 112 and the lower cover portion 113 may be formed by stacking a single dielectric layer or two or more dielectric layers on the upper and lower surfaces of the capacitance forming portion A in the thickness direction, respectively, and basically play a role of preventing damage to the internal electrodes due to physical or chemical stress.

The upper cover portion 112 and the lower cover portion 113 do not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

The body 110 of the multilayer electronic component 100 according to an exemplary embodiment in the present disclosure may include first margin portions 114 and 115 disposed on one surface and the other surface of the capacitance forming portion A in the second direction.

Referring to FIG. 2, the margin portions 114 and 115 in the second direction may include a first margin portion 114 disposed on the third surface 3 of the body 110 and a first margin portion 115 disposed on the fourth surface 4 of the body 110. That is, the first margin portions 114 and 115 may be disposed on both side surfaces of the body 110 in a length direction.

As shown in FIG. 2, the first margin portions 114 and 115 may refer to regions occupied by the dielectric layer in a region between ends of the capacitance forming portion in the second direction and the third and fourth surfaces in a cross-section of the body 110 taken in the first and second directions.

The first margin portions 114 and 115 may basically serve to prevent the first internal electrode and the second external electrode from being electrically connected to each other or to prevent the second internal electrode and the first external electrode from being electrically connected to each other, and may serve to prevent damage to the internal electrodes due to physical or chemical stress.

The body 110 of the multilayer electronic component 100 according to an exemplary embodiment in the present disclosure may include second margin portions 116 and 117 disposed on one surface and the other surface of the capacitance forming portion A in the third direction.

Figure 3:
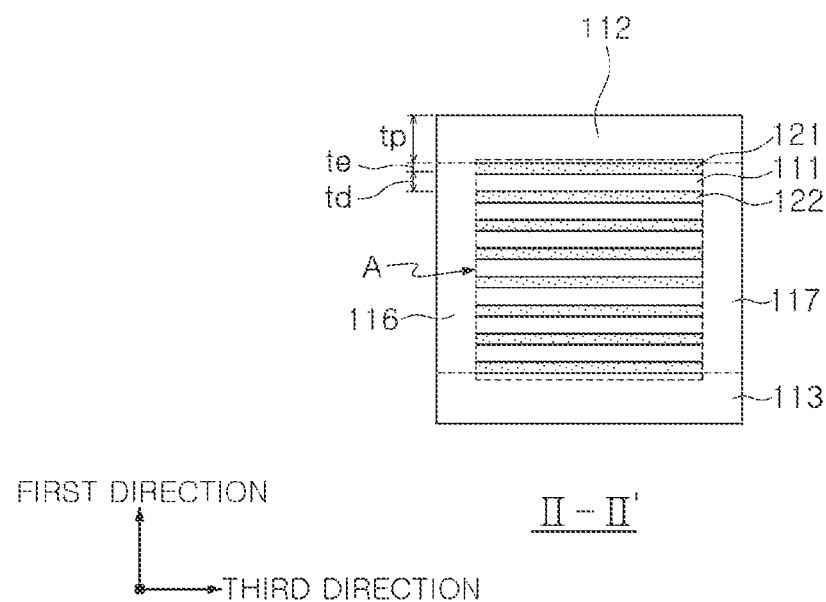
FIG. 3 schematically illustrates a cross-sectional view taken along II-II' of FIG. 1.

Referring to FIG. 3, the margin portions 116 and 117 in the third direction may include a second margin portion 116 disposed on the fifth surface 5 of the body 110 and a second margin portion 117 disposed on the sixth surface 6 of the body 110. That is, the second margin portions 116 and 117 may be disposed on both sides of the body 110 in the width direction.

As shown in FIG. 3, the second margin portions may refer to regions occupied by the dielectric layer in a region between the ends of the capacitance forming portion in the second direction and the fifth and sixth surfaces in a cross-section of the body 110 taken in the first and third directions.

The second margin portions 116 and 117 may basically serve to prevent damage to the internal electrodes due to physical or chemical stress.

The second margin portions 116 and 117 may be formed by forming the internal electrodes by applying a conductive paste on a ceramic green sheet except for a portion in which the margin portions are to be formed.

In addition, in order to suppress a step difference due to the internal electrodes 121 and 122, the second margin portions 116 and 117 may be formed by cutting the internal electrodes, after stacking, to be exposed to the fifth and sixth surfaces 5 and 6 of the body and then stacking a single dielectric layer or two or more dielectric layers on both side surfaces of the capacitance forming portion A on both side surfaces in the width direction.

The internal electrodes 121 and 122 may be alternately disposed with the dielectric layer 111 interposed therebetween.

The internal electrodes 121 and 122 may include first and second internal electrodes 121 and 122. The first and second internal electrodes 121 and 122 may be alternately disposed to oppose each other with the dielectric layer 111 constituting the body 110 interposed therebetween, and may be in contact with the first and second external electrodes 131 and 132 on the third and fourth surfaces 3 and 4 of the body 110, respectively.

Referring to FIG. 2, the first internal electrode 121 may be spaced apart from the fourth surface 4 and may be in contact with the first external electrode 131 on the third surface 3, and the second internal electrode 122 may be spaced apart from the third surface 3 and may be in contact with the second external electrode 132 on the fourth surface 4.

Here, the first and second internal electrodes 121 and 122 may be separated from each other by the dielectric layer 111 disposed therebetween.

Figure 4:
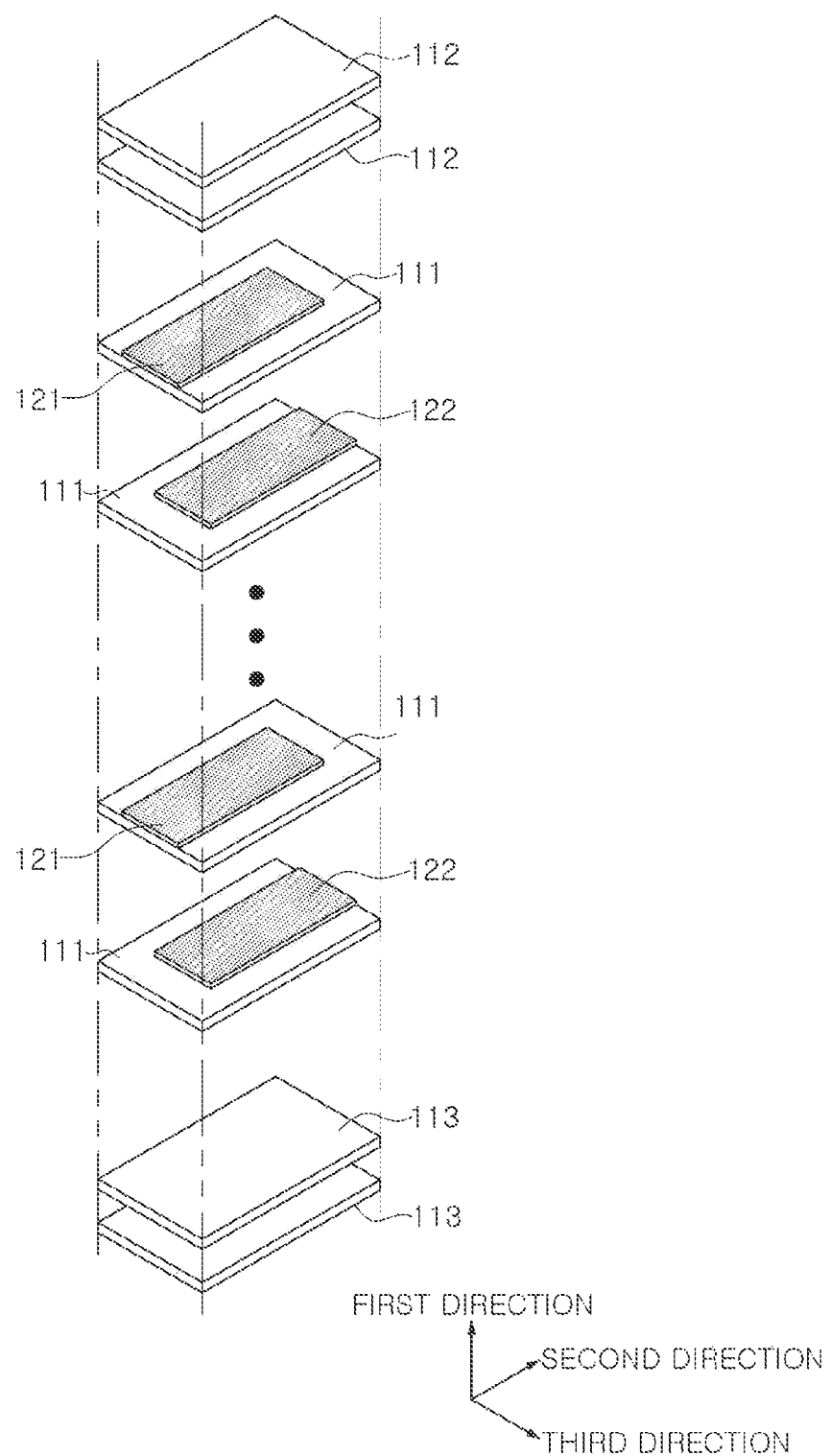
FIG. 4 is an exploded perspective view schematically illustrating a body in which a dielectric layer and an internal electrode are stacked according to an exemplary embodiment or another exemplary embodiment in the present disclosure.
Figure 5:
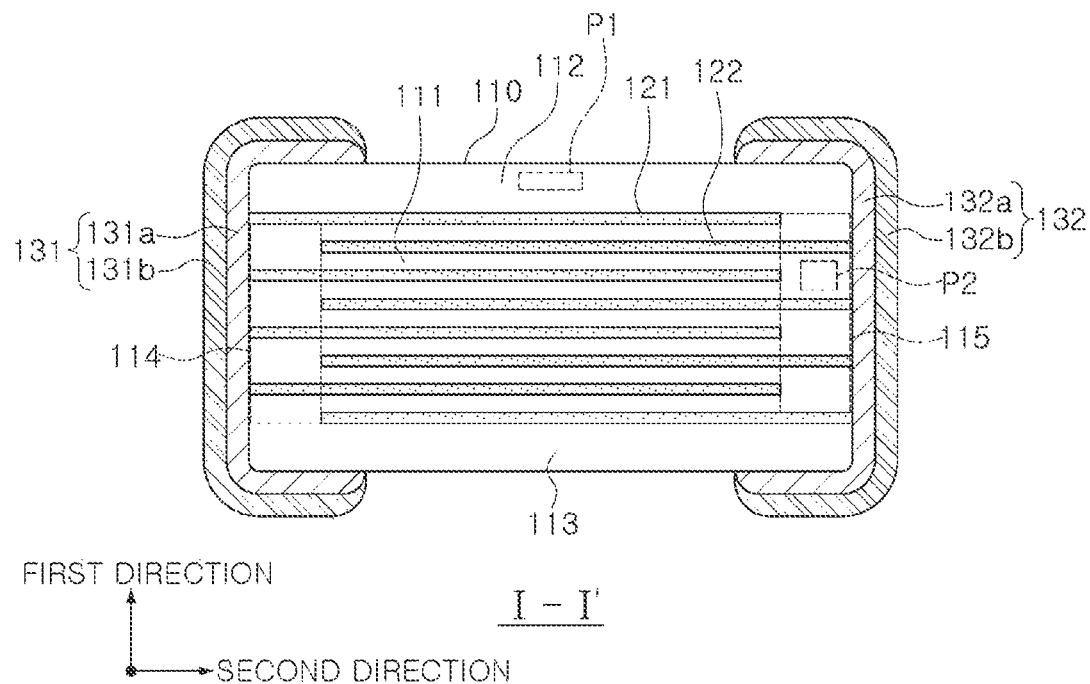
FIG. 5 schematically illustrates a region in which average hardness is measured in the cross-sectional view taken along line I-I' of FIG. 1.
Figure 6:
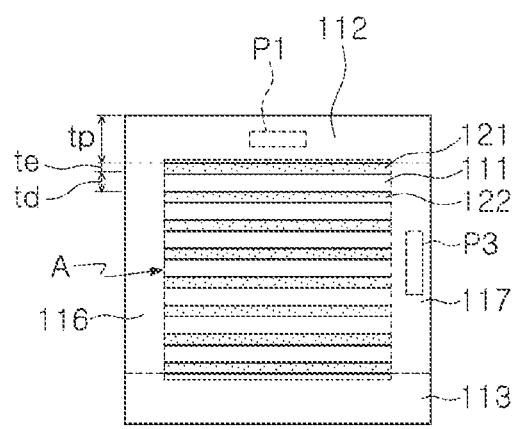
FIG. 6 schematically illustrates a region in which average hardness is measured in the cross-sectional view taken along line II-II'.

Referring to FIG. 4, The body 110 may be formed by stacking a ceramic green sheet on which the first internal electrode 121 is printed and a ceramic green sheet on which the second internal electrode 122 is printed and subsequently sintering the stack.

The conductive metals included in the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

In addition, the internal electrodes 121 and 122 may be formed by printing a conductive paste on a ceramic green sheet, and as a method of printing a conductive paste for internal electrodes, a screen printing method or a gravure printing method may be used.

Referring to FIGS. 1 to 2, the multilayer electronic component 100 according to an exemplary embodiment in the present disclosure may include the body 110 and the first external electrode 131 disposed outside of the body 110 and connected to the first internal electrode 121 and the second external electrode 132 connected to the second internal electrode 122.

Meanwhile, the external electrodes 131 and 132 may be formed using any material as long as the material has electrical conductivity, such as metal, and specific materials may be determined in consideration of electrical characteristics and structural stability, and furthermore, may have a multilayer structure.

For example, the external electrodes 131 and 132 may include electrode layers 131a and 132a disposed on the body 110 and plating layers 131b and 132b disposed on the electrode layers 131a and 132a.

As a more specific example of the electrode layers 131a and 132a, the electrode layers 131a and 132a may be sintered electrodes including conductive metal and glass or resin-based electrodes including conductive metal and resin.

In addition, the electrode layers 131a and 132a may have a form in which a sintered electrode and a resin-based electrode are sequentially formed on a body. In addition, the electrode layers 131a and 132a may be formed by transferring a sheet including a conductive metal onto the body or by transferring a sheet including a conductive metal onto the sintered electrode.

As the conductive metal included in the electrode layers 131a and 132a, a material having excellent electrical conductivity may be used, but is not particularly limited thereto. For example, the conductive metal may be one or more of nickel (Ni), copper (Cu), and alloys thereof.

The plating layers 131b and 132b serve to improve mounting characteristics. The type of the plating layers 131b and 132b is not particularly limited, and may be a plating layer including at least one of Ni, Sn, Pd, and alloys thereof, and may be formed of a plurality of layers.

As a more specific example of the plating layers 131b and 132b, the plating layers 131b and 132b may be Ni plating layers or Sn plating layers, and a Ni plating layer and a Sn plating layer may be sequentially formed on the electrode layers 131a and 132a or a Sn plating layer, a Ni plating layer, and a Sn plating layer may be sequentially formed. In addition, the plating layers 131b and 132b may include a plurality of Ni plating layers and/or a plurality of Sn plating layers.

In the case of the multilayer electronic component of the related art, an internal electrode adjacent to the margin portion may be thinner than a central portion due to the manufacturing process. This phenomenon may occur as the dielectric layer and the internal electrodes are elongated as pressure is applied to the multilayer electronic component by stacking and compressing processes during the manufacturing process of the capacitor.

In particular, the multilayer electronic component 100 manufactured in this manner may have poor withstand voltage characteristics and poor high-temperature reliability in a high-temperature and high-pressure environment.

Therefore, in order to improve the high-temperature reliability and high-temperature accelerated life of the multilayer electronic component, it is necessary to minimize the elongation of the internal electrode and the dielectric layer.

In the multilayer electronic component 100 according to the exemplary embodiment in the present disclosure, $-3.0 < \{1-(Hc/H1)\} \times 100 \leq 0.4$ where an average hardness of the cover portions 112 and 113 is Hc and an average hardness of the first margin portions 114 and 115 is H1.

If a value of $\{1-(Hc/H1)\} \times 100$ is $-3.0$ or less, the degree of elongation of the dielectric layer and the internal electrode may not be reduced, so the effect of improving high-temperature reliability and withstand voltage characteristics is insufficient.

When the value of $\{1-(Hc/H1)\} \times 100$ is greater than $-3.0$ and less than or equal to 0.4, the degree of elongation of the dielectric layer and the internal electrode may be small, so that high-temperature reliability and withstand voltage characteristics may be improved.

When the value of $\{1-(Hc/H1)\} \times 100$ exceeds 0.4, it may be difficult to improve reliability and withstand voltage characteristics because excessive cost may be consumed or process difficulty increases to implement a hardness difference.

Accordingly, the multilayer electronic component 100 according to the exemplary embodiment in the present disclosure satisfies the value of $\{1-(Hc/H1)\} \times 100$ exceeding $-3.0$ and less than or equal to 0.4, thereby reducing the degree of elongation of the dielectric layer and the internal electrodes to improve high-temperature reliability and withstanding voltage characteristics.

In addition, in the multilayer electronic component 100 according to the exemplary embodiment in the present disclosure, $-3.0 < \{1-(Hc/H2)\} \lambda 100 \leq 0.4$ where an average hardness of the cover portions 112 and 113 is Hc and an average hardness of the second margin portions 116 and 117 is H2.

If the value of $\{1-(Hc/H2)\} \times 100$ is $-3.0$ or less, the degree of elongation of the dielectric layer and the internal electrode may not be reduced, so the effect of improving high-temperature reliability and withstand voltage characteristics is insufficient.

When the value of $\{1-(Hc/H2)\} \times 100$ is greater than $-3.0$ and less than or equal to 0.4, the degree of elongation of the dielectric layer and the internal electrode is small, so that high-temperature reliability and withstand voltage characteristics may be improved.

When the value of $\{1-(Hc/H2)\} \times 100$ exceeds 0.4, it may be difficult to improve reliability and withstand voltage characteristics because excessive cost may be consumed or process difficulty increases to implement a hardness difference.

Accordingly, the multilayer electronic component 100 according to the exemplary embodiment in the present disclosure satisfies the value of $\{1-(Hc/H2)\} \times 100$ exceeding $-3.0$ and 0.4 or less, thereby reducing the degree of elongation of the dielectric layer and the internal electrodes to improve high-temperature reliability and withstanding voltage characteristics.

A method of measuring the average hardness of the first margin portions 114 and 115, the second margin portions 116 and 117, and the cover portions 112 and 113 is as follows.

A method of measuring an average hardness of the first margin portions 114 and 115 and the cover portions 112 and 113 is as follows.

First, an L-T cross-section is cut at the central portion of the multilayer electronic component 100 in the width direction and molded.

Thereafter, hardness may be measured at 20 random points P1 and P2 of the first margin portions 114 and 115 and the cover portions 112 and 113 in the L-T cross-section using a nanoindenter (product name G200, KLA), and an average of the measured hardness values may be calculated.

In a method of measuring an average hardness of the margin portions 116 and 117 in the third direction, first, a W-T cross-section is cut at the central portion of the multilayer electronic component 100 in the length direction and molded.

Thereafter, hardness may be measured at 20 random points P3 of the second margin portions 116 and 117 in the W-T cross-section using a nanoindenter, and an average of the measured hardness values may be calculated.

Meanwhile, the method of controlling the average hardness of the first margin portions 114 and 115, the second margin portions 116 and 117, and the cover portions 112 and 113 is not particularly limited, but for example, the average hardness may be controlled by adding Mineral Spirits to a sheet forming the first margin portions 114 and 115, the second margin portions 116 and 117, and the cover portions 112 and 113 and adjusting the amount of the Mineral Spirits.

The Mineral Spirits are one of the petroleum solvents including a specific liquid hydrocarbon oil of petroleum. Kerosene [boiling point 150 to 320° C.] or naphtha [boiling point 35 to 220° C.] as a raw material is subjected to impurity removal and desulfurization process and then subjected to a distillation separation process to obtain a product of desired boiling point distribution, and thereafter, the product is subjected to aromatic content adjustment to obtain a product having a desired composition. This difference in boiling points assigns the ceramic sheet breathability and fluidity.

Specifically, as the content of Mineral Spirits included in the ceramic green sheet forming the first margin portions 114 and 115, the second margin portions 116 and 117, and the cover portions 112 and 113 increases, fluidity of organic substances to the margin portions is improved, and as a result, an average hardness increases, and as the content of Mineral Spirits decreases, the average hardness decreases.

The content of Mineral Spirits included in the ceramic green sheet may be 2.5 wt % or less based on a total weight of the ceramic green sheet. However, the Mineral Spirits may be evaporated during a sintering process and thus may not be detected from a final product.

In an exemplary embodiment, the average hardness of the first margin portions 114 and 115 and the average hardness of the dielectric layer 111 included in the capacitance forming portion A may be substantially the same.

Accordingly, a step that may occur during the stacking and compressing process of the multilayer electronic component 100 may be reduced, thereby further improving the withstand voltage characteristics and high-temperature reliability of the multilayer electronic component 100.

In an exemplary embodiment, the average hardness of the second margin portions 116 and 117 and the average hardness of the dielectric layer 111 included in the capacitance forming portion A may be substantially the same.

Accordingly, a step that may occur during the stacking and compressing process of the multilayer electronic component 100 may be reduced, thereby further improving the withstand voltage characteristics and high-temperature reliability of the multilayer electronic component 100.

When it is mentioned that the average hardness is substantially the same, it may mean that the average hardness values measured by the method for measuring the average hardness do not necessarily identical numerically, and may refer to a case in which a difference of values of the average hardness is within 0.1%, within 0.05%, or within 0.01%.

In order to simultaneously achieve miniaturization and high capacitance of the multilayer electronic component 100, the thickness of the dielectric layer and the internal electrodes should be thinned to increase the number of stacks. However, when the dielectric layer is formed as a thin layer, it may be difficult to secure withstand voltage characteristics and high temperature reliability of the dielectric layer may not be secured.

In addition, the thickness of the dielectric layer does not need to be specifically limited. However, if an average thickness of the dielectric layers is 0.4 μm or less, it may be difficult to control process defects that may occur in the margin portions, so it may be difficult to secure withstand voltage characteristics and it may also be difficult to secure high temperature reliability.

According to an exemplary embodiment in the present disclosure, when $-3.0<\{1-(Hc/H1)\}\times100\leq0.4$ or $-3.0<\{1-(Hc/H2)\}\times100<0.4$ is satisfied, excellent withstand voltage characteristics and high temperature reliability may be secured at the same time even when the average thickness of the dielectric layers 111 is 0.4 μm or less.

Therefore, when the average thickness of the dielectric layers 111 is 0.4 μm or less, the effect of improving the withstand voltage characteristics and high temperature reliability according to the present disclosure may be more remarkable.

Meanwhile, that the average thickness of the dielectric layers 111 is 0.4 μm or less does not necessarily mean that it should have a value of 0.4 μm or less and may refer to a case in which the dielectric layer has a thickness thinner than that of the dielectric layer of the multilayer electronic component of the related art.

The average thickness of the dielectric layer 111 may refer to an average thickness of the dielectric layers 111 disposed between the first and second internal electrodes 121 and 122.

The average thickness of the dielectric layer 111 may be measured by scanning an image of a cross-section (L-T cross-section) of the body 110 in the length and thickness directions by a scanning electron microscope (SEM).

For example, thicknesses of a random dielectric layer extracted from the image of the cross-section (L-T cross-section) of the body 110 taken at the central portion of the body 110 in the width direction scanned by the SEM may be measured at 30 points at equal intervals in the length direction, and an average of the thicknesses may be measured.

The 30 points at equal intervals may be measured in a capacitance forming portion, which means a region in which the first and second internal electrodes 121 and 122 overlap each other.

The thicknesses of the first margin portions 114 and 115, the second margin portions 116 and 117, and the cover portions 112 and 113 do not need to be particularly limited. However, if the average thickness of at least one of the first margin portions 114 and 115, the second margin portions 116, 117, and the cover portions 112 and 113 is 20 μm or less, it may be difficult to prevent damage to the internal electrodes due to physical or chemical stress.

According to an exemplary embodiment in the present disclosure, when $-3.0<\{1-(Hc/H1)\}\lambda100<0.4$ or $-3.0<\{1-(Hc/H2)\}\times100\leq0.4$ is satisfied, the thickness of the second margin portions 116 and 117 and the cover portions 112 and 113 do not need to be particularly limited. However, even when the average thickness of at least one of the first margin portions 114 and 115, the second margin portions 116 and 117, and the cover portions 112 and 113 is 20 μm or less, damage to the internal electrodes may be prevented, excellent withstand voltage characteristics may be secured, and excellent high-temperature reliability may be secured.

Accordingly, in an exemplary embodiment, the average thickness of the first margin portions 114 and 115 or the second margin portions 116 and 117 may be 20 μm or less.

In addition, in an exemplary embodiment, the average thickness of the cover portions 112 and 114 may be 20 μm or less.

The average thickness of the first margin portions 114 and 115 may be measured by scanning an image of the cross-section (L-T cross-section) of the body 110 in the length and thickness directions of the body 110 with an SEM.

For example, thicknesses of random first margin portions 114 and 115 extracted from the image of the cross-section (L-T cross-section) of the body 110 in the length and thickness directions taken at the central portion of the body 110 in the width (W) direction scanned by the SEM may be measured at 10 points at equal intervals in the thickness direction, and an average of the thicknesses may be measured.

The average thickness of the second margin portions 116 and 117 may be measured by scanning an image of the cross-section (W-T cross-section) of the body 110 in the width and thickness directions of the body 110 with an SEM.

For example, thicknesses of random first second portions 116 and 117 extracted from the image of the cross-section (W-T cross-section) of the body 110 in the width and thickness directions taken at the central portion of the body 110 in the length (L) direction scanned by the SEM may be measured at 10 points at equal intervals in the thickness direction, and an average of the thicknesses may be measured.

The average thickness of the cover portions 112 and 113 may be measured by scanning an image of the cross-section (L-T cross-section) of the body 110 taken in the length and thickness directions of the body 110 with an SEM.

For example, thicknesses of random cover portions 112 and 113 extracted from the image of the cross-section (L-T cross-section) of the body 110 in the length and thickness directions taken at the central portion of the body 110 in the width (W) direction scanned by an SEM may be measured at 10 points at equal intervals in the length direction, and an average of the thicknesses may be measured.

In addition, the thicknesses of the first and second internal electrodes 121 and 122 do not need to be particularly limited. However, the average thickness of the first and second internal electrodes 121 and 122 may be 0.4 μm or less in order to more easily achieve miniaturization and high capacitance of the multilayer electronic component 100.

However, if the average thickness of the first and second internal electrodes 121 and 122 is 0.4 μm or less, the internal electrodes tend to be elongated in the stacking and compressing processes, so that it may be difficult to secure withstand voltage characteristics and it may be difficult to secure high temperature reliability.

According to an exemplary embodiment in the present disclosure, when $-3.0<\{1-(Hc/H1)\}\times100\leq0.4$ or $-3.0<\{1-(Hc/H2)\}\times100<0.4$ is satisfied, excellent withstand voltage characteristics and high temperature reliability may be secured at the same time even when the average thickness of the internal electrodes 121 and 122 is 0.4 μm or less.

Therefore, when the average thickness of the first and second internal electrodes 121 and 122 is 0.4 μm or less, the effect of improving the withstand voltage characteristics and high temperature reliability according to the present disclosure may be more remarkable.

The average thickness of the first and second internal electrodes 121 and 122 may be measured by scanning an image of a cross-section (L-T cross-section) of the body 110 in the length and thickness directions by an SEM.

For example, thicknesses of random first and second internal electrodes 121 and 122 extracted from the image of the cross-section (L-T cross-section) of the body 110 taken at the central portion of the body 110 in the width direction scanned by the SEM may be measured at 30 points at equal intervals in the length direction, and an average of the thicknesses may be measured.

The 30 points at equal intervals may be measured in a capacitance forming portion, which means a region in which the first and second internal electrodes 121 and 122 overlap each other.

A size of the multilayer electronic component 100 does not need to be particularly limited.

However, in order to achieve miniaturization and high capacitance at the same time, it is necessary to increase the number of stacks by reducing the thicknesses of the dielectric layer and the internal electrodes, and therefore, the reliability and insulation resistance improvement effect according to the present disclosure may be more remarkable in the multilayer electronic component 100 having a size of 0402 (length×width, 0.4 mm×0.2 mm) or less.

Accordingly, when a distance between the third and fourth surfaces of the body is defined as L and a distance between the fifth and sixth surfaces is defined as W, L may be 0.4 mm or less and W may be 0.2 mm or less. That is, it may be the multilayer electronic component 100 having a size of 0402 (length×width, 0.4 mm×0.2 mm) or less.

Exemplary Embodiment 1

Table 1 below shows changes in the average hardness H2 of the second margin portions 116 and 117 and the average hardness Hc of the cover portions 112 and 113 over the content of Mineral Spirits included in the ceramic green sheet forming the second margin portions 116 and 117 and the cover portions 112 and 113.

TABLE 1

| Test No. | Content of Mineral Spirits (wt %) | Average hardness (Gpa) Hc | Average hardness (Gpa) H2 | {1 − Hc/H2)} × 100 (%) |
|---|---|---|---|---|
| 1 | 0.0 | 14.62 | 14.16 | −3.2 |
| 2 | 1.0 | 14.69 | 14.26 | −3.0 |
| 3 | 2.5 | 14.66 | 14.61 | −0.3 |
| 4* | 5.0 | 14.59 | 14.65 | 0.4 |
| 5* | 11.5 | 14.71 | 14.68 | −0.2 |

*Comparative Example

In the case of Test Nos. 1 to 5, it can be seen that average hardness of the second margin portions 116 and 117 and the cover portions 112 and 113 may be adjusted by adjusting the content of Mineral Spirits included in the ceramic green sheet.

However, it can be seen that, in the case of Test Nos. 4 and 5, in which the content of Mineral Spirits exceeds 2.5 wt %, the efficiency of improving the average hardness is not large.

Accordingly, in an exemplary embodiment, the second margin portions 116 and 117 or the cover portions 112 and 113 may be formed by sintering a dielectric green sheet containing Mineral Spirits, and the content of the Mineral Spirits may be 2.5 wt % or less.

Meanwhile, the method of adjusting the average hardness by satisfying the Mineral Spirits of 2.5 wt % or less may be applied to the first margin portions 114 and 155 as well.

Exemplary Embodiment 2

Table 2 below shows the effects of the ratio of the average hardness of the second margin portions to the average hardness of the cover portions on the withstand voltage characteristics and high temperature reliability.

First, a sample of a multilayer electronic component having a 3225 size (length×width, 3.2 mm×2.5 mm), a nominal capacity of 10 μF, and a rated voltage of 50 V is prepared.

For the withstand voltage characteristics, a voltage was applied to 400 samples from 0V at room temperature until dielectric breakdown occurred, and a minimum voltage (breakdown voltage (BDV)) at which electricity started was measured and an average value was taken.

In a high-temperature reliability test, a voltage of 60V was applied to 400 samples in a high-temperature atmosphere of 150° C. for 24 hours, and the number of samples in which insulation resistance deterioration or short circuit occurred was measured.

TABLE 2

| Test No. | {1 − (Hc/H2)} × 100 (%) | BDV (V) | High-temperature reliability (150° C., 1.2 Vr, 24 hr) |
|---|---|---|---|
| 1* | −3.80% | 362.7 | 2/400 |
| 2* | −3.30% | 372.1 | 0/400 |
| 3* | −3.00% | 366.9 | 1/400 |
| 4 | −0.30% | 389.2 | 0/400 |
| 5 | 0.10% | 387.5 | 0/400 |
| 6 | 0.40% | 391.8 | 0/400 |

*Comparative Example

Test Nos. 1 to 3 are cases in which the value of $\{1-(Hc/H2)\} \times 100$ is −3.0 or less, and it can be seen that the dielectric breakdown easily occurred, so that the withstand voltage characteristics were not good and the effect of improving the high-temperature reliability was insufficient.

Test Nos. 4 to 6 are cases in which the value of $\{1-(Hc/H2)\} \times 100$ exceeds −3.0 and is less than 0.4, and it can be confirmed that they have excellent withstand voltage characteristics and high-temperature reliability.

According to an exemplary embodiment in the present disclosure, since the value of $\{1-(Hc/H2)\} \times 100$ greater than −3.0 and 0.4 or less is satisfied, a phenomenon in which the dielectric layer and the internal electrodes are elongated during the stacking and compressing processes of the multilayer electronic component is minimized, thereby improving withstand voltage characteristics and high temperature reliability.

One of the several effects of the present disclosure is to improve the withstand voltage characteristics and high temperature reliability by minimizing the elongation of the dielectric layer and the internal electrodes during the stacking and compressing processes of the multilayer electronic component.

One of several effects of the present disclosure is to secure excellent withstand voltage characteristics and high-temperature reliability even in a multilayer electronic component in which an internal electrode and a dielectric layer are thinned.

However, various and beneficial advantages and effects of the present disclosure are not limited to the above and may be more easily understood in the course of describing specific exemplary embodiments of the present disclosure.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes disposed to oppose each other with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and
first and second external electrodes disposed outside of the body and connected to the first and second internal electrodes, respectively, in the second direction,
wherein the body further includes: a capacitance forming portion, by which capacitance of the multilayer electronic component is defined, having the first and second internal electrodes disposed to oppose each other with the dielectric layer interposed therebetween, cover portions disposed on two opposing surfaces of the capacitance forming portion in the first direction, and first margin portions disposed on two opposing surfaces of the capacitance forming portion in the second direction, and
wherein $-3.0 < \{1-(Hc/H1)\} \times 100 \leq 0.4$, where an average hardness of the cover portions is Hc and an average hardness of the first margin portions is H1.

2. The multilayer electronic component of claim 1, wherein the average hardness of the first margin portions and an average hardness of the dielectric layer included in the capacitance forming portion are substantially equal to each other.

3. The multilayer electronic component of claim 1, wherein an average thickness of the first margin portions in the second direction is 20 μm or less.

4. The multilayer electronic component of claim 1, wherein an average thickness of the dielectric layer is 0.4 μm or less, and an average thickness of the first and second internal electrodes is 0.4 μm or less.

5. The multilayer electronic component of claim 1, wherein an average thickness of the cover portions in the first direction is 20 μm or less.

6. The multilayer electronic component of claim 1, wherein L is 0.4 mm or less and W is 0.2 mm or less, where L is a distance between the third and fourth surfaces and W is a distance between the fifth and sixth surfaces.

7. A multilayer electronic component comprising:
a body including a dielectric layer and first and second internal electrodes disposed to oppose each other with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and
first and second external electrodes disposed outside of the body and connected to the first and second internal electrodes, respectively, in the second direction,
wherein the body further includes a capacitance forming portion, by which capacitance of the multilayer electronic component is defined, having the first and second internal electrodes disposed to oppose each other with the dielectric layer interposed therebetween, cover portions disposed on two opposing surfaces of the capacitance forming portion in the first direction, and second margin portions disposed on two opposing surfaces of the capacitance forming portion in the third direction, and
wherein $-3.0 \leq \{1-(Hc/H2)\} \times 100 \leq 0.4$, where an average hardness of the cover portions is Hc and an average hardness of the second margin portions is H2.

8. The multilayer electronic component of claim 7, wherein the average hardness of the second margin portions and an average hardness of the dielectric layer included in the capacitance forming portion are substantially equal to each other.

9. The multilayer electronic component of claim 7, wherein an average thickness of the second margin portions in the third direction is 20 μm or less.

10. The multilayer electronic component of claim 7, wherein an average thickness of the dielectric layer is 0.4 μm or less, and an average thickness of the first and second internal electrodes is 0.4 μm or less.

11. The multilayer electronic component of claim 7, wherein an average thickness of the cover portions in the first direction is 20 μm or less.

12. The multilayer electronic component of claim 7, wherein L is 0.4 mm or less and W is 0.2 mm or less, where L is a distance between the third and fourth surfaces and W is a distance between the fifth and sixth surfaces.

* * * * *